(12) United States Patent
Kang et al.

(10) Patent No.: US 7,734,115 B2
(45) Date of Patent: Jun. 8, 2010

(54) METHOD FOR FILTERING IMAGE NOISE USING PATTERN INFORMATION

(75) Inventors: Moon-Gi Kang, Seoul (KR); Gun-Shik Shin, Seoul (KR); Chang-Won Kim, Seoul (KR); Min-Kyu Park, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 925 days.

(21) Appl. No.: 11/526,479

(22) Filed: Sep. 25, 2006

(65) Prior Publication Data

US 2007/0133895 A1    Jun. 14, 2007

(30) Foreign Application Priority Data

Dec. 8, 2005   (KR) .................. 10-2005-0119450
Sep. 20, 2006  (KR) .................. 10-2006-0091216

(51) Int. Cl.
G06K 9/40    (2006.01)
(52) U.S. Cl. ...................... 382/275; 382/261
(58) Field of Classification Search ................ 382/254, 382/260–264, 274, 275; 358/3.26, 3.27
See application file for complete search history.

(56) References Cited

U.S. PATENT DOCUMENTS

| | | | |
|---|---|---|---|
| 5,038,388 A * | 8/1991 | Song | 382/266 |
| 5,771,318 A * | 6/1998 | Fang et al. | 382/261 |
| 7,092,579 B2 * | 8/2006 | Serrano et al. | 382/254 |

FOREIGN PATENT DOCUMENTS

| | | |
|---|---|---|
| KR | 2001-32809 | 4/2001 |
| KR | 2003-2608 | 1/2003 |

OTHER PUBLICATIONS

Lee, Jong-Sen; "Refined Filtering of Image Noise Using Local Statistics;" Computer Graphics and Image Processing; Apr. 1981; XP008064816.
Rangayyan, R.M. et al.; "Adaptive-Neighborhood Filtering of Images Corrupted by Signal-Dependent Noise;" Applied Optics, vol. 37, No. 20; Jul. 10, 1998; XP002146454.

(Continued)

*Primary Examiner*—Yon Couso
(74) *Attorney, Agent, or Firm*—Cha & Reiter, LLC

(57) ABSTRACT

Disclosed is a method for removing image noise using pattern information, which filters noise caught by a sensor during preprocessing of a compression codec, so as to increase a compression efficiency, and noise caused by the codec during post-processing of the codec, so as to obtain high quality images. The method includes the steps of: (a) carrying out region dispersion with respect to input image signals so that the image signals are dispersed with a predetermined pixel size; (b) calculating mean brightness of the input image signals and carrying out noise dispersion with respect to the input image signals; (c) switching a low frequency and a high frequency based on image signals which are subjected to the region dispersion and the noise dispersion; (d) removing noise based on a statistic after obtaining the region average with respect to the image signals having the low frequency; and (e) removing noise based on a similarity of pixels after analyzing patterns with relation to the image signals having the high frequency.

7 Claims, 10 Drawing Sheets

OTHER PUBLICATIONS

Jiang, Shiaw-Shiang et al.; "Noise Updating Repeated Wiener Filter and Other Adaptive Noise Smoothing Filters Using Local Image Statistics;" Applied Optics, vol. 25, No. 14, Jul. 15, 1986; XP008050468.

Buades, A. et al.; "A Non-Local Algorithm for Image Denoising;" Jun. 20, 2005; XP10817500.

Jha, Rajesh; "Edge Adaptive Filtering: How Much and Which Direction?;" IEEE; Nov. 14, 1989.

Rank, K. et al.; "Estimation of Image Noise Variance;" IEE Proc.-Vis. Image Signal Process, vol. 146, No. 2, Apr. 1999; XP000833796.

Lee, Jong-Sen; "Digital Image Enhancement and Noise Filtering by Use of Local Statistics;" IEEE Transactions on PAMI, vol. PAMI-2, No. 2, Mar. 1980; XP001042089.

* cited by examiner

METHOD FOR FILTERING IMAGE NOISE USING PATTERN INFORMATION

CLAIM OF PRIORITIES

This application claims priorities to applications entitled "Method For Filtering Image Noise Using Pattern Information" filed with the Korean Intellectual Property Office on Dec. 8, 2005 and assigned Serial No. 2005-119450, and filed on Sep. 20, 2006 and assigned Serial No. 2006-91216, the entire contents of which are hereby incorporated by reference as if fully set forth herein.

BACKGROUND OF THE INVENTION

1. Field of the Invention

The present invention relates to image compression technology. More particularly, the present invention relates to a method for filtering image noise using pattern information. Most particularly, the present invention relates to an image noise filtering method which can effectively filter image noise remaining on an edge of an image before or after the image is compressed in a display unit, thereby substantially producing images in which noise is filtered.

2. Description of the Related Art

Generally, a charge coupled device (CCD) or CMOS sensor has the characteristic of generating noise due to a quantity of light or heat. Such noise does not have a Gaussian (or Laplacian) statistic characteristic but has a signal-dependent characteristic. Therefore, since the noise of the sensor is not white, it is difficult to easily filter the noise by a general noise filtering algorithm. Further, although the noise is filtered, a segment of a high frequency of the signal can be damaged by the filtering. Noise filtering is one of image processing fields which have been researched for a long time. Such a noise filtering algorithm may be generally classified into a technology using a restoration concept, and a method using a filtering technology.

Since the restoration technology is based an accurately modeling the noise, it is possible to obtain an excellent result. However, the restoration technology is computationally intensive. Thus, a method using a statistical characteristic of a local region of an image, for example a Local Linear Minimum Mean Square Error (LLMMSE), is often used.

On the other hand, filtering technologies which can be realized by means of hardware have also been used for image processing fields. Mean series filters have been used in order to filter noise having Gaussian statistical characteristics, while median series filters have been used in order to filter noise having Laplacian statistical characteristics.

In the mean series filtering method, a mean filter and a median filter are used to filter image noise. The method for filtering the image noise using the mean filter is a basic mean filter, which calculates a mean of the value of inner pixels in a local region of the image. This is low pass filtering and has a disadvantage of filtering a segment of a high frequency necessary for the image as well as noise, resulting in filtering precise portions of the image. In order to solve the above-mentioned problem, a local statistic of an image is calculated using equations (1) and (2), reflecting a non-stationary characteristic of the image, under a condition that a contour is not crossed in a mask:

$$\hat{x}_{AWA(m,n;k)} = \sum_{i,j \in S_{m,n;k}} w(i,j;l)y(i,j;l), \quad \text{Equation (1)}$$

wherein $S_{m,n,k}$ is a mask.

$$w(i,j;l) = \frac{k(m,n;k)}{1 + a(\max[\varepsilon^2, (g(m,n;k) - g(i,j;l))^2])}, \quad \text{Equation (2)}$$

wherein k(m,n;k) is a normalization constant.

The image noise filtering method using the median filter effectively filters the Laplacian noise (first statistical noise characteristic) such as salt and pepper noise. The filtering method is calculated using the equation (3):

$$\hat{x}_{MF(m,n)} = \text{median } \{y(i,j)|(i,j \in S_{m,n})\} \quad \text{Equation (3)}$$

The median filter effectively filters noise in an even region excluding an edge. However, the median filter has a disadvantage of damaging information along a narrow line or corner.

Further, a conventional LLMMSE filter is based on a Non-stationary Mean Non-stationary Variance (NMNV) image model, and is expressed using equation (4):

$$\hat{x}_{LLMMSE(i,j)} = \quad \text{Equation (4)}$$
$$E(y(i,j)) + \frac{\sigma_x^2(i,j)}{\sigma_x^2(i,j) + \sigma_n^2(i,j)}(y(i,j) - E(y(i,j))),$$

where and $\sigma_x^2$ and $\sigma_n^2$ indicate a non-stationary dispersion of x and n, respectively. Here, it is assumed that the noise dispersion $\sigma_n^2$ is a value which is presumed or already known. It is well known that the LLMMSE filter smoothes the noise in the even region ($\sigma_x^2 \cong \sigma_n^2$)($\hat{x}_{LLMMSE(i,j)} \cong E(y(i,j))$), but does not filter small pixels ($\sigma_x^2 >> \sigma_n^2$) near a boundary, as shown in FIG. 1 ($\hat{x}_{LLMMSE(i,j)} \cong y(i,j)$).

A mean value series filter is easily calculated so that it can be realized in real-time. However, since a weight function used for preserving contour is determined by a difference between two pixel values, the mean value series filter is affected by the noise and cannot effectively filter the noise around the contour. Further, the mean value series filter has a disadvantage in that the images are contrived because of too much smoothing of the noise in the even region.

The median series filter is rarely used because of the difficulty of realizing it in hardware due to it computation intensity. The LLMMSE filter can effectively filter noise in the even region, but cannot effectively filter noise in a region near the boundary. Further, the LLMMSE filter has a disadvantage in that the weight function is affected by the noise, like the mean series filter.

SUMMARY OF THE INVENTION

The present invention provides a method for filtering image noise using pattern information. The method of the present invention can filter noise caught by a sensor during preprocessing of a compression codec, so as to increase compression efficiency, and reduce noise caused by the codec during post-processing of the codec, thereby resulting in high quality images.

BRIEF DESCRIPTION OF THE DRAWINGS

The above and other features, and advantages of the present invention will be more apparent from the following detailed description taken in conjunction with the accompanying drawings, in which.

DETAILED DESCRIPTION OF THE INVENTION

Hereinafter, a preferred embodiment of the present invention is described in detail with reference to the accompanying drawings. For the purposes of clarity and simplicity, a detailed description of known functions and configurations incorporated herein is omitted to avoid making the subject matter of the present invention unclear.

Figure 1:
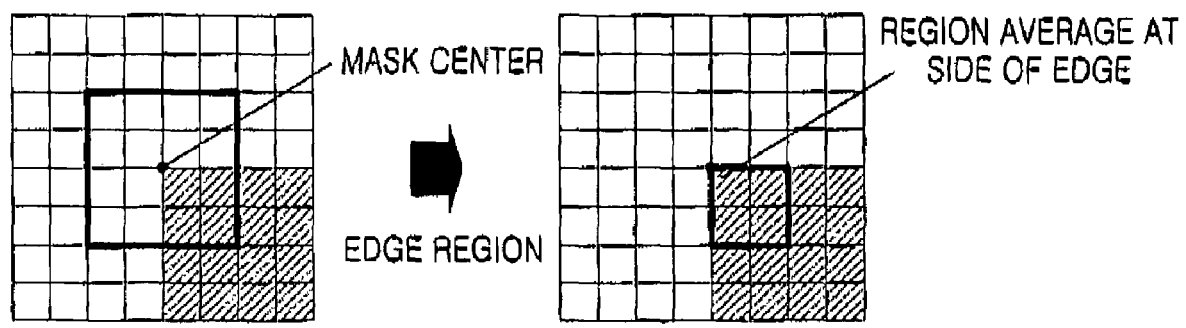
FIG. 1 is a view showing pixels in order to illustrate a conventional filtering concept.
Figure 2:
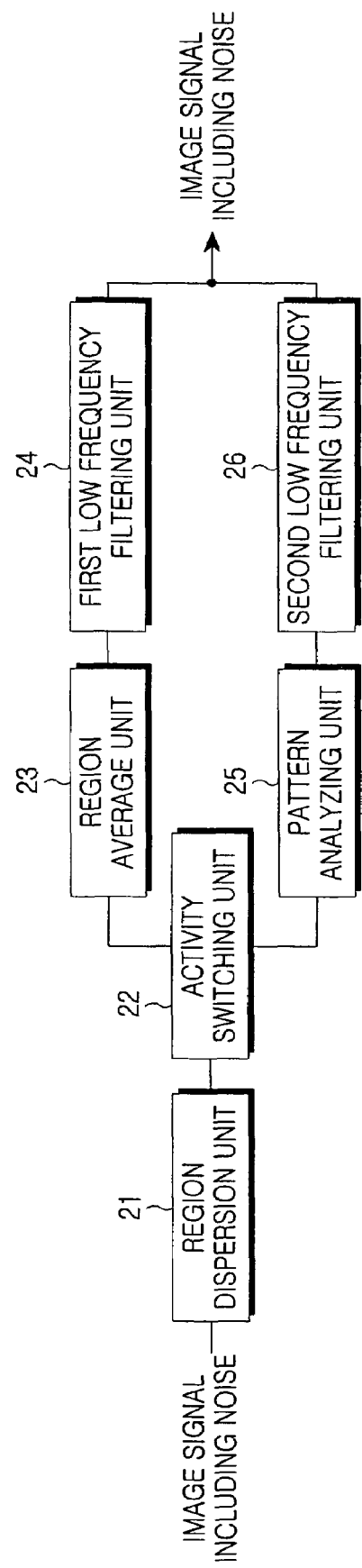
FIG. 2 is a block diagram illustrating a system for filtering image noise using pattern information according to the present invention.

FIG. 2 is a block diagram illustrating a system for filtering image noise using pattern information according to the present invention.

Referring to FIG. 2, the system for filtering image noise according to the present invention includes a region dispersion unit 21, an activity switching unit 22, a region mean unit 23, a first low frequency filtering unit 24, a pattern analyzing unit 25, and a second low frequency filtering unit 26.

The region dispersion unit 21 determines weight at a low frequency in order to reflect a statistical characteristic of signals with respect to input image signals.

The activity switching unit 22 compares region dispersion with noise dispersion and carries out a switching of frequency so that noise at a low frequency can be filtered if the region dispersion is smaller than the noise dispersion, while noise at a high frequency can be filtered if the region dispersion is larger than the basis of dispersion.

The region mean unit 23 equalizes regions having low frequency image signals.

The first low frequency filtering unit 24 filters noise from images equalized by the region mean unit 23 in consideration of the statistical characteristic of weight to determine the extent of noise removal based on the region dispersion.

The pattern analyzing unit 25 searches for pixels having an identical pattern with current pixels, and analyzes patterns by assigning a weight to the pixels.

The second low frequency filtering unit 26 filters noise based on the similarity of pixels according to patterns analyzed by the pattern analyzing unit.

Hereinafter, a method for filtering image noise using pattern information according to the present invention is described with reference to FIG. 3.

The present invention substantially includes a switching algorithm for determining frequency, filtering of noise at a low frequency, and filtering of noise at a high frequency, in consideration of a partial characteristic of signals.

Figure 3:
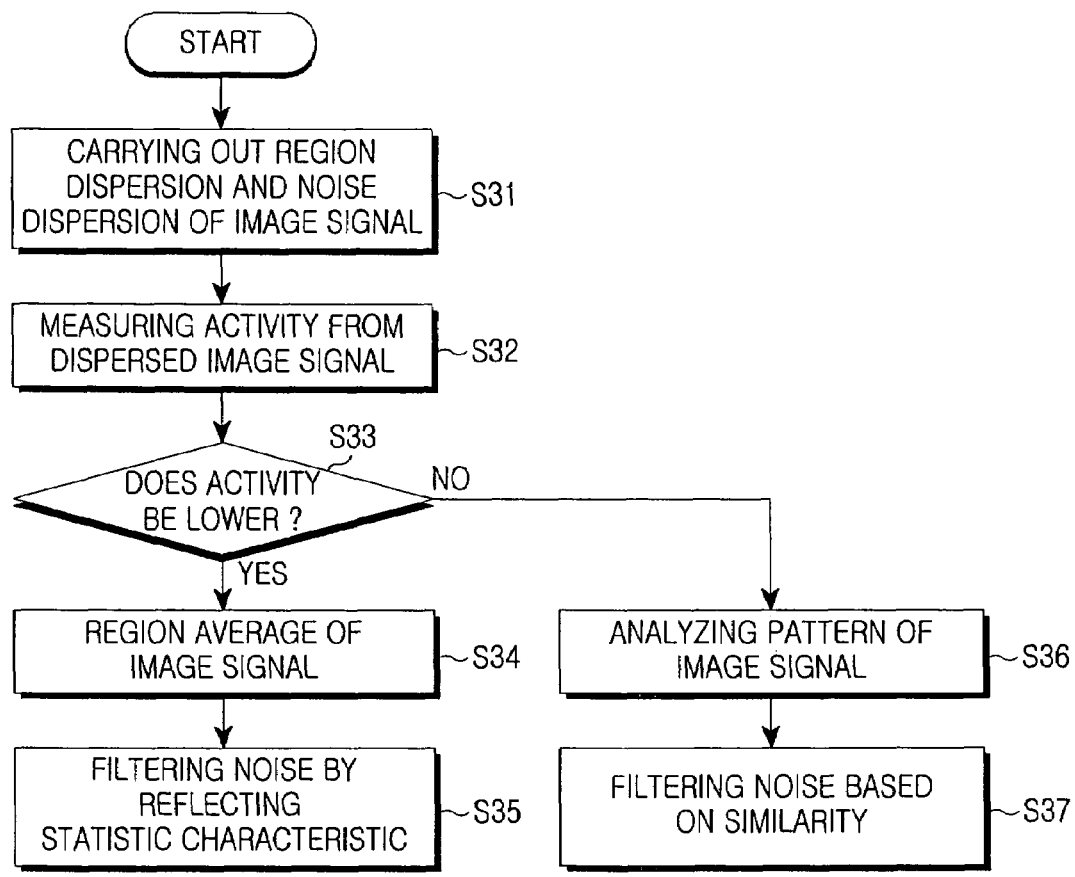
FIG. 3 is a flowchart illustrating a method for filtering image noise using pattern information according to the present invention.

Referring to FIG. 3, the present invention carries out a step for measuring partial frequency of input image signals when the image signals are input from outside. Generally, the frequency of the signals can be determined from the extent of the high frequency. Although high frequency filtering can be directly used in order to determine the extent of the high frequency, a preferred embodiment of the present invention obtains the region dispersion and noise dispersion based on the statistical characteristic and similarity of the signals (S31).

A region dispersion metric is used for determining the weight at the low frequency as well as for dividing and processing the frequency of the signal in different ways. In particular, the present invention carries out region dispersion with respect to input image signals so that the input image signals are dispersed using a predetermined pixel size, and calculates mean brightness of the region-dispersed image signals and carrying out noise dispersion with respect to the input image signals. The region dispersion $V_L(i,j)$ according to the preferred embodiment of the present invention is obtained using equation (5):

$$v_L(i, j) = \frac{1}{MN} \sum_{<m>} \sum_{<n>} \{y(m, n) - m_L(i, j)\}^2, \quad \text{Equation (5)}$$

wherein M and N denote length and width of a mask, and $m_L(i, j)$ indicates the region mean at a position of $(i, j)$. $m_L(i, j)$ is obtained using equation (6):

$$m_L(i, j) \frac{1}{MN} \sum_{<m>} \sum_{<n>} y(m, n) \quad \text{Equation (6)}$$

In the preferred embodiment of the present invention, if the region dispersion of the pixel is smaller than $2v_N$, it is determined that the frequency is low. Otherwise, if the region dispersion is larger than $2v_N$, it is determined that the frequency is high.

As a result of measuring frequency at step S33, when the frequency of the image signal is low, the region mean of the image signal is determined and then noise is filtered from the image signal by reflecting the statistical characteristic (S34 and S35).

Specifically, in the method for removing the noise at a low frequency of the present invention, it is determined that the region with low frequency is substantially similar to an even region. Since the removal of noise in the even region can be performed by the existing method, the embodiment of the present invention uses a Local Linear Minimum Mean Square Error (LLMMSE) filter. The weight determining the extent of noise removal in the LLMMSE filter is obtained using equation (7) and is based on the region dispersion:

$$\hat{x}_{LLMMSE(i,j)} = E(y(i, j)) + \frac{\sigma_x^2(i, j)}{\sigma_x^2(i, j) + \sigma_n^2(i, j)}(y(i, j) - E(y(i, j))).$$

Equation (7)

As described above, if the region dispersion of image $\sigma_x^2(i, j)$ is similar to $\sigma_n^2$, the weight is added to the mean. To the contrary, if $\sigma_x^2(i, j)$ has a larger value than that of $\sigma_n^2$, a large amount of weight is added to y(i, j). The operating principle of most existing noise removal filters including the LLMMSE filter is that a weight is added to original signals in an edge region. According to this operating principle, noise in the edge region cannot be filtered.

However, in the case of significantly dispersing noise, since noise still remains along the edge, noise in the even region is filtered, but noise in the edge region is not filtered. Thus, a contrived effect results. Therefore, in a preferred embodiment of the present invention, noise in the low frequency is filtered by using the LLMMSE filter and noise in the high frequency is filtered through pattern analysis.

Meanwhile, as a result of measuring a frequency at step S33, when the frequency of image signals is high, the pattern of image signals is analyzed and then noise is filtered from the image signals based on similarity (S36 and S37).

In the method for removing noise at high frequency according to the present invention, the noise in the region such as an edge must be filtered. The method of the present invention differs from the conventional methods in that a large amount of weight is added to the original value along the edge. The method searches for pixels with a pattern identical to a current pixel and adds a large weight to the matching pixels. The noise value is obtained using equation (8):

$$\hat{x}(i, j) = \sum_{\langle m \rangle}\sum_{\langle n \rangle} w(m, n)x(m, n)$$

Equation (8)

Here, the weight w(m, n) is obtained by a difference vector $L_2$-norm in equation (9):

$$w(m, n) = \frac{1}{Z}e^{-[\sum_{\langle j \rangle}\sum_{\langle t \rangle}\{y(i,j)-y(m+s,n+t)\}^2]/h^2},$$

Equation (9)

wherein in the denominator Z is a normalization constant to make a sum of weights be one, and h is a constant to add a weight based on a distance between peripheral pixels. Generally, h is dependent on the noise dispersion.

Here, the reason for using a Gaussian weight is to equally add the weight to the main region, and to add a little amount of weight to a position at a distance. If pixels at a current position (i, j) are filtered from Σ, salt-and-pepper noise can be effectively filtered. Accordingly, if $L_2$-norm in the difference vector is great, the current pixel differs from the pattern. Thus, a small amount of weight is added to the image signal. To the contrary, if $L_2$-norm in the difference vector is small, the current pixel is identical with the pattern. Thus, a large amount of weight is added to the image signal.

Therefore, the mean of the pixels having the same pattern as the current pixel can be obtained, thereby removing the noise along the edge region while protecting the edge.

Hereinafter, the method for removing image noise using the pattern information according to the present invention is described with reference to FIGS. 4 to 15.

Figure 4:
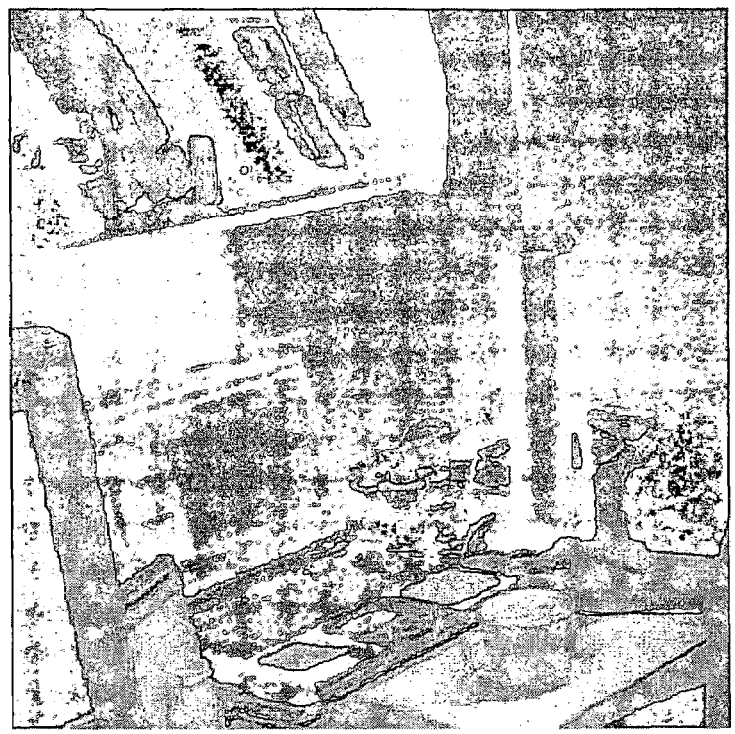
FIG. 4 illustrates an original image.
Figure 5:
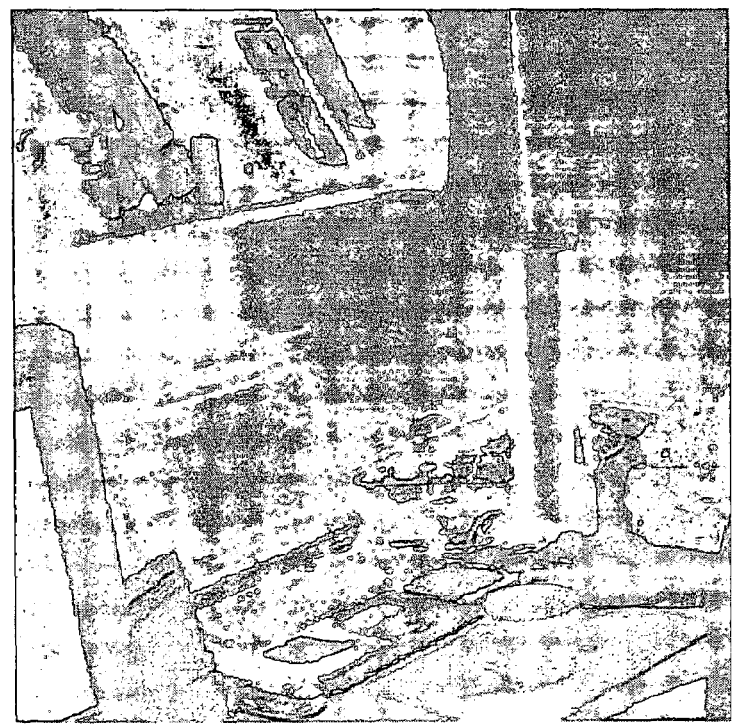
FIG. 5 illustrates an image of FIG. 4 from which noise is filtered using a buffer of seven lines by the region mean unit and the first low frequency filtering unit in FIG. 2.

FIG. 4 is a picture taken using a CCD two mega-pixel camera. In FIG. 4, it is shown that noise is present evenly in the entire image. FIG. 5 shows an image from which noise is filtered using a buffer of seven lines by the region mean unit and the first low frequency filtering unit in FIG. 2. Since weight is added to the image depending on a low frequency and a high frequency, the even region in which the frequency is low shows proper smoothing. However, noise is not filtered from the region, in which the frequency is high, such as an edge, so that the image in the edge region is contrived.

Figure 6:
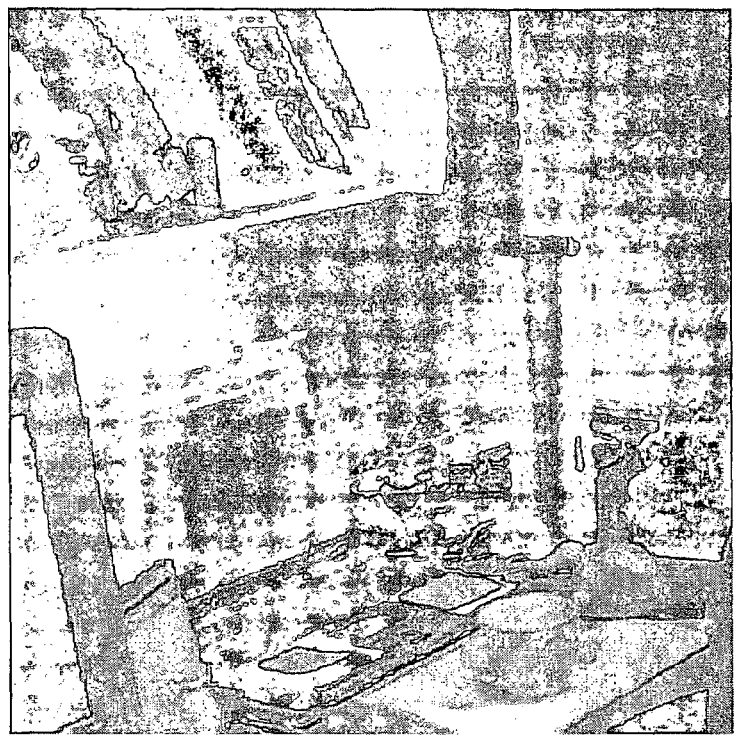
FIG. 6 illustrates an image of FIG. 4 from which noise is filtered using a buffer of seven lines by the pattern analyzing unit and the second low frequency filter unit of FIG. 2.

FIG. 6 shows a picture from which noise is filtered using a buffer of seven lines by the pattern analyzing unit and the second low frequency filtering unit of FIG. 2. In FIG. 6, the weight is added to the image not according to frequency but according to the similarity of the pattern to that of the currently processed pixel. Thus, the edge region is relatively natural. However, only a small amount of noise is filtered from the even region.

Figure 7:
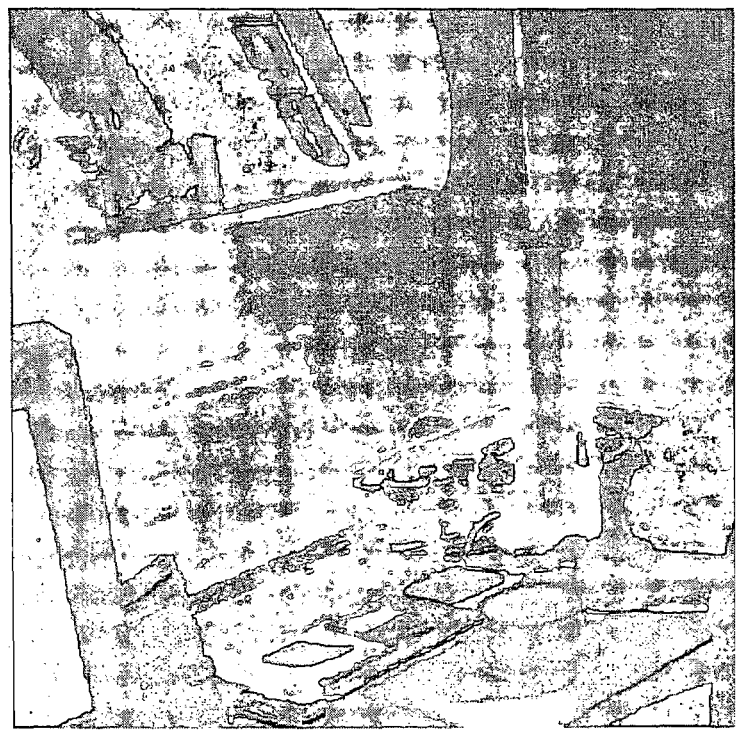
FIG. 7 shows the result image filtered by the proposed algorithm.
Figure 8:
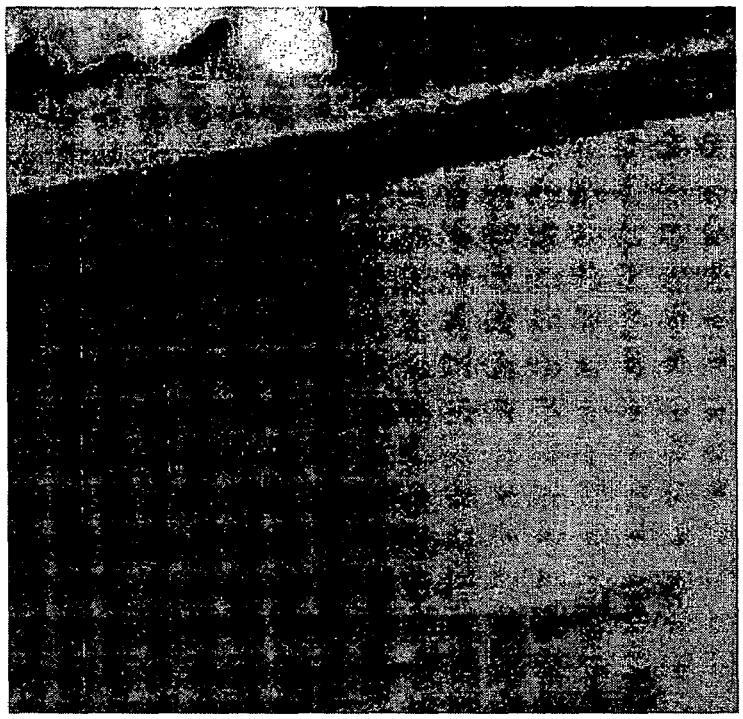
FIG. 8 illustrates an enlargement of affected parts of FIG. 5.
Figure 9:
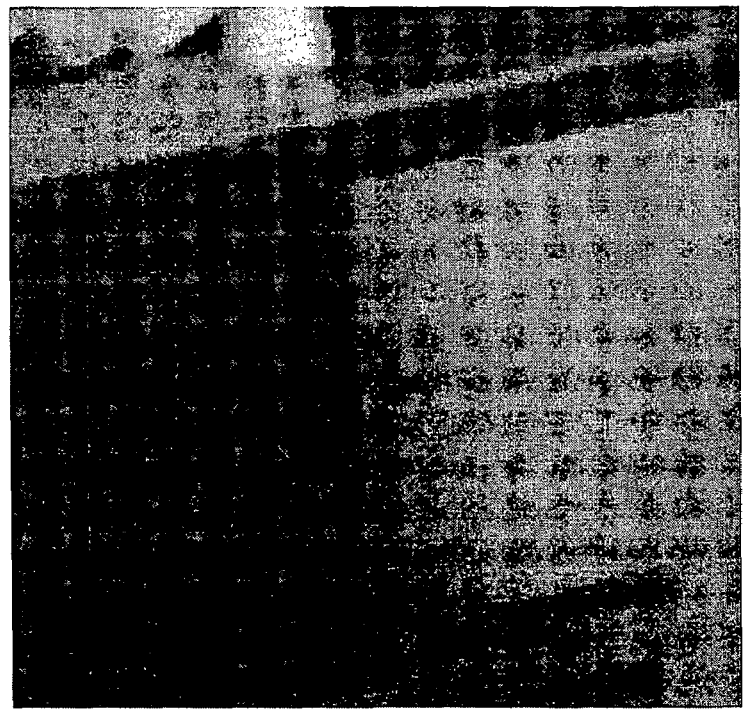
FIG. 9 illustrates an enlargement of affected parts of the image of FIG. 6.
Figure 10:
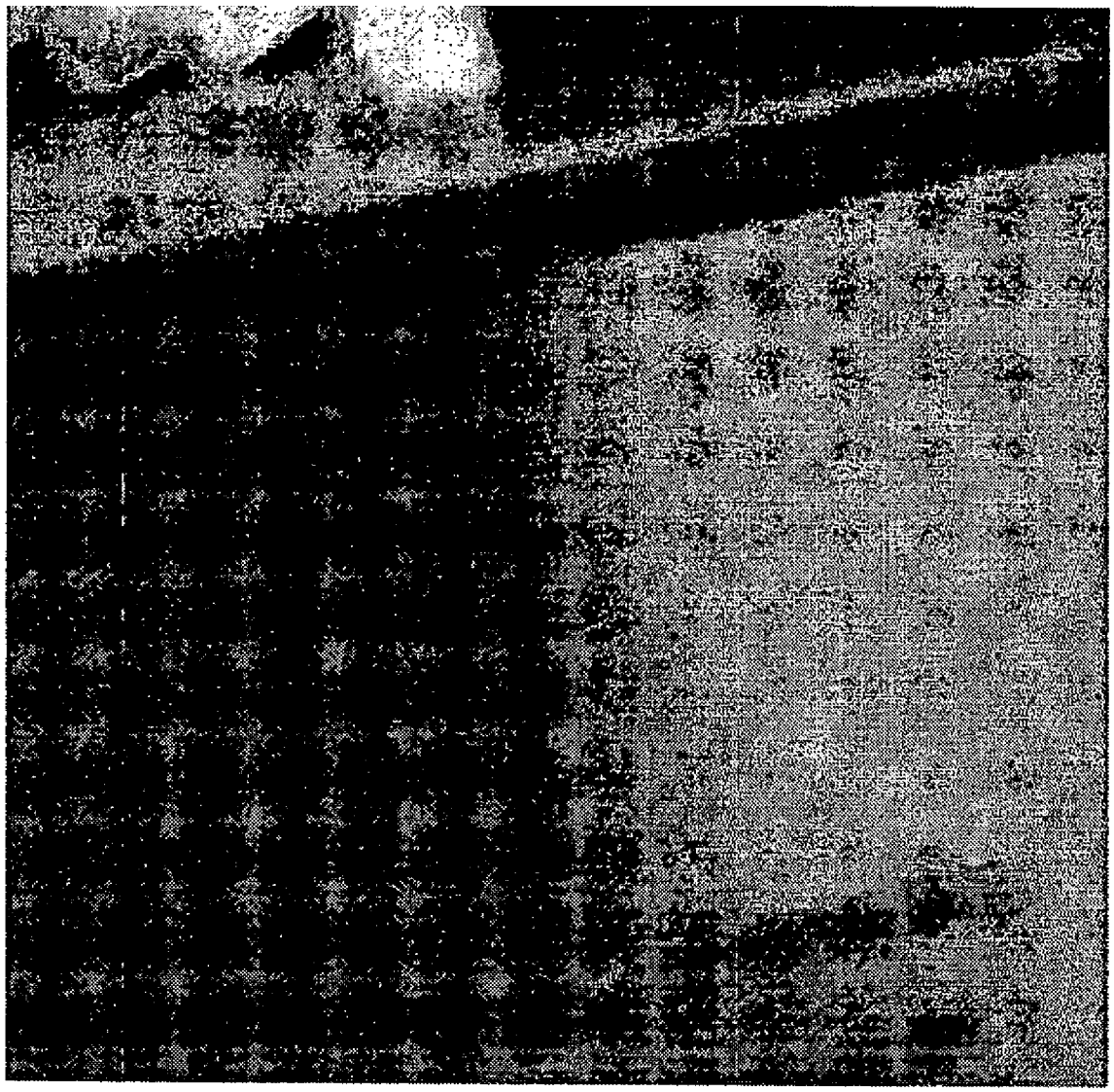
FIG. 10 illustrates an enlargement of affected parts of FIG. 7.

The algorithm disclosed in the present invention avoids disadvantages in each case and provides only advantages. As shown in FIG. 7, according to the present invention, noise is well filtered from the even region shown in FIG. 5, and also noise is effectively filtered from the edge shown in FIG. 6. These results can be easily identified through the enlargements in FIGS. 8 through 10.

FIGS. 11 to 15 show example results with respect to an input image used for comparing algorithms.

Figure 11:
FIG. 11 illustrates an image to which SNR noise of 15 dB has been added.
Figure 12:
FIG. 12 illustrates the image of FIG. 11 after a conventional noise removal algorithm has been carried out on the image.
Figure 13:
FIG. 13 illustrates the image of FIG. 11 after noise has been filtered therefrom according to the present invention.
Figure 14:
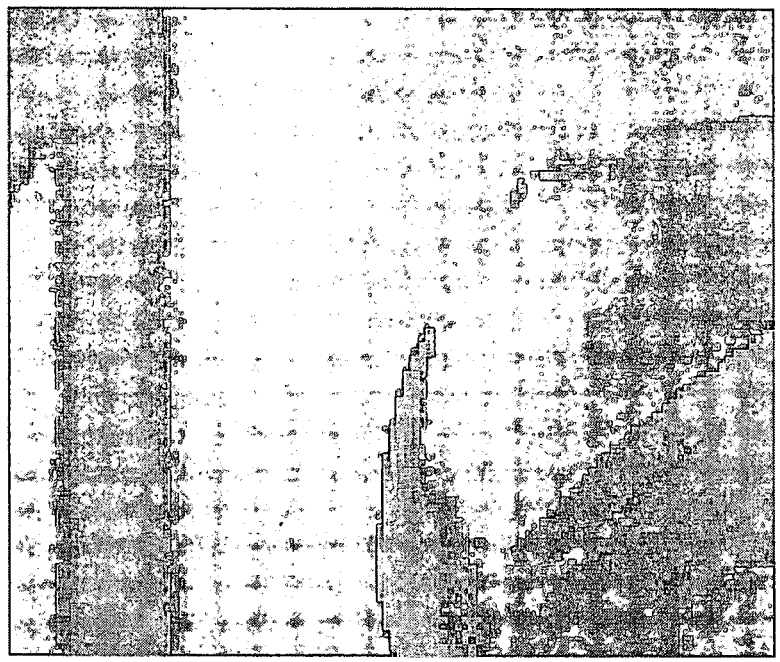
FIGS. 14 and 15 illustrate enlarged views of FIGS. 12 and 13, respectively, in which the respective differences between FIG. 14 and FIG. 12, and FIG. 15 and FIG. 13 are made obvious by the enlargements of pertinent parts thereof.
Figure 15:
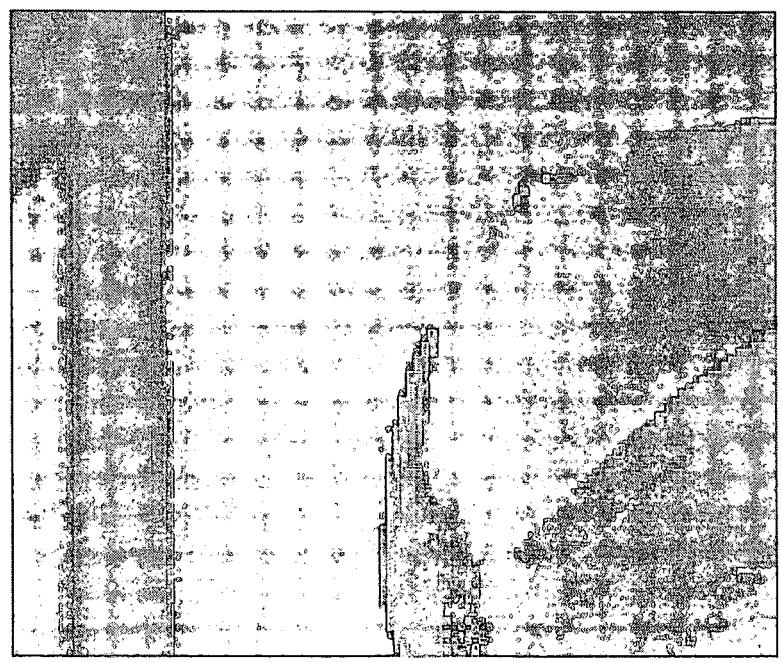

FIG 11 shows an image to which SNR noise of 15 dB has been added, FIG. 12 shows the same image after a conventional noise removal algorithm has been carried out on the image, and FIG. 13 shows the same image from which noise has been filtered according to the present invention. By examining differences between the original noise-enhanced image of FIG. 11 and the images of FIGS. 12 and 13, it can be seen that the method according to the present invention more effectively filters noise from the edge with relation to the original noisy image in comparison with the conventional method. FIGS. 14 and 15 are enlarged views of FIGS. 12 and 13, respectively, in which the differences between FIG. 14 and FIG. 12, and FIG. 15 and FIG. 13 are made obvious by the enlargements thereof.

As described above, the present invention performs the region dispersion and noise dispersion with respect to the image signals including noise, and then determines a frequency. Next, a regional mean of image regions in which the frequency is low is calculated and then noise is filtered from the edge depending on the statistic, while the pattern analysis of the image regions in which the frequency is high is performed and then noise is filtered from the edge based on the similarity. Thus, the noise remaining along the edge, which is not filtered by the conventional method, is effectively filtered by the method of the present invention, thereby providing natural images from which noise is filtered.

Further, with respect to the determination of the weight function, the present invention determines the weight function not depending on the difference between two pixel values, but by using a peripheral pixel value. Thus, the present invention is not substantially affected by noise and can provide natural images because processing pixel values have a great similarity.

The present invention filters indistinctness along the edge, so as to increase compression efficiency during a compression step which is carried out after the removal of the indistinctness. Further, when the present invention functions as a post processor, the present invention filters various errors which occur due to compression, such as noise, blocking effect, and howling effect, etc.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for removing image noise using pattern information, the method comprising the steps of:
   (a) calculating, by a region dispersion unit, region dispersion value of pixels of the input image using a predetermined pixel size;
   (b) calculating, by the region dispersion unit, mean brightness of the input image, and calculating noise dispersion value of the pixels of the input image with respect to the input image;
   (c) switching, by an activity switching unit, each of the pixels between a low frequency and a high frequency based on whether the noise dispersion value of each pixel is larger or smaller than the corresponding region dispersion value;
   (d) removing, by a first low frequency filtering unit, noise from the pixels having the low frequency based on a statistical characteristic after obtaining a region average determined, by the region dispersion unit, with respect to the switched pixels having the low frequency; and
   (e) removing, by a second low frequency filtering unit, noise from the pixels having the high frequency resulting from step (d) based on a similarity of pixels after analyzing pixel patterns of the pixels having the high frequency;
   wherein step (e) further comprises the step of identifying pixels of the image signals with the high frequency having a pattern identical to a current pixel and adding a weight to the identified pixels so as to filter noise.

2. The method as claimed in claim 1, wherein at step (a) the region dispersion $v_L(i, j)$ is obtained using the equation:

$$v_L(i, j) = \frac{1}{MN}\sum_{<m>}\sum_{<n>}\{y(m, n) - m_L(i, j)\}^2$$

wherein M and N denote length and width of a mask, and $m_L(i, j)$ indicates the region mean at a position of $(i, j)$.

3. The method as claimed in claim 2, wherein the region mean $m_L(i, j)$ is obtained by the equation:

$$m_L(i, j) = \frac{1}{MN}\sum_{<m>}\sum_{<n>}y(m, n).$$

4. The method as claimed in claim 1, wherein at step (c), it is determined that the frequency is low if the region dispersion of pixels is smaller than $2v_N$, while it is determined that the frequency is high if the region dispersion is greater than $2v_N$.

$$v_L(i, j) = \frac{1}{MN}\sum_{<m>}\sum_{<n>}\{y(m, n) - m_L(i, j)\}^2.$$

5. The method as claimed in claim 1, wherein at step (d) noise in the images is filtered by an LLMMSE filter.

6. The method as claimed in claim 1, wherein weight is added to the pixels using the equation:

$$\hat{x}(i, j) = \sum_{<m>}\sum_{<n>}w(m, n)x(m, n).$$

7. The method as claimed in claim 6, wherein the weight $w(m, n)$ is obtained by a difference vector $L_2$-norm in the following equation:

$$w(m, n) = \frac{1}{Z}e^{-[\sum_{<s>}\sum_{<t>}\{y(i,j)-y(m+s,n+t)\}^2]/h^2},$$

wherein a denominator Z is a normalization constant to make a sum of weights be one, and h is a constant to add a weight based on a distance between peripheral pixels.

* * * * *